United States Patent
Katole et al.

(10) Patent No.: US 12,400,466 B2
(45) Date of Patent: Aug. 26, 2025

(54) RASTER IMAGE DIGITIZATION USING MACHINE LEARNING TECHNIQUES

(71) Applicant: Schlumberger Technology Corporation, Sugar Land, TX (US)

(72) Inventors: Atul Laxman Katole, Bangalore (IN); Hiren Maniar, Houston, TX (US); Denzil Francis Crasta, Mangalore (IN); Preeti Gupta, Pune (IN); Aria Abubakar, Sugar Land, TX (US); Aaron Scollard, Houston, TX (US); Ekansh Verma, Bengaluru (IN); Purnaprajna Mangsuli, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 323 days.

(21) Appl. No.: 17/908,633

(22) PCT Filed: Mar. 2, 2021

(86) PCT No.: PCT/US2021/020480
§ 371 (c)(1),
(2) Date: Sep. 1, 2022

(87) PCT Pub. No.: WO2021/178412
PCT Pub. Date: Sep. 10, 2021

(65) Prior Publication Data
US 2023/0128933 A1   Apr. 27, 2023

Related U.S. Application Data

(60) Provisional application No. 62/985,379, filed on Mar. 5, 2020.

(51) Int. Cl.
G06V 30/413    (2022.01)
G06T 5/70    (2024.01)
(Continued)

(52) U.S. Cl.
CPC .............. *G06V 30/413* (2022.01); *G06T 5/70* (2024.01); *G06T 5/77* (2024.01); *G06T 7/12* (2017.01);
(Continued)

(58) Field of Classification Search
None
See application file for complete search history.

(56) References Cited

U.S. PATENT DOCUMENTS 9,911,210 B1 * 3/2018 Witte .................... G06T 11/203
10,095,984 B1 * 10/2018 Venter ................. G06F 16/9024
(Continued)

FOREIGN PATENT DOCUMENTS

CN     110148088 A  *  8/2019  ............. G06T 5/002

OTHER PUBLICATIONS

Extended Search Report issued in European Patent Application No. 21764087.9 dated Dec. 18, 2023, 6 pages.
(Continued)

*Primary Examiner* — Bernard Krasnic
(74) *Attorney, Agent, or Firm* — Jeffrey D. Frantz

(57) ABSTRACT

A method for digitizing image-based data includes receiving an image file including one or more target objects, generating an intermediate image by removing noise from the image file using a denoising machine learning model, identifying the one or more target objects included in the intermediate image using an object segmentation machine learning model, discretizing the one or more target objects that were identified using the trained object segmentation machine learning model, and storing the one or more target objects that were discretized in a data file, visualizing the one or more target objects, or both.

18 Claims, 12 Drawing Sheets

(51) Int. Cl.

| | | |
|---|---|---|
| *G06T 5/77* | (2024.01) | |
| *G06T 7/12* | (2017.01) | |
| *G06T 7/60* | (2017.01) | |
| *G06V 10/30* | (2022.01) | |
| *G06V 10/70* | (2022.01) | |
| *G06V 30/41* | (2022.01) | |
| *G06V 30/422* | (2022.01) | |

(52) U.S. Cl.
CPC ............... *G06T 7/60* (2013.01); *G06V 10/30* (2022.01); *G06V 10/70* (2022.01); *G06V 30/41* (2022.01); *G06V 30/422* (2022.01); *G06V 2201/07* (2022.01)

(56) References Cited

U.S. PATENT DOCUMENTS

| | | |
|---|---|---|
| 2017/0371856 A1 | 12/2017 | Can et al. |
| 2018/0033147 A1 | 2/2018 | Becker et al. |
| 2018/0253873 A1* | 9/2018 | Witte .................... G06T 11/206 |
| 2019/0043172 A1 | 2/2019 | Chui et al. |
| 2019/0180115 A1* | 6/2019 | Zou ....................... G06V 20/588 |
| 2019/0197358 A1 | 6/2019 | Madani et al. |
| 2019/0302290 A1 | 10/2019 | Alwon |
| 2020/0335086 A1 | 10/2020 | Paraskevopoulos et al. |
| 2021/0097371 A1 | 4/2021 | Puscas et al. |
| 2021/0158104 A1 | 5/2021 | Wu et al. |
| 2021/0174131 A1 | 6/2021 | Schwartz |

OTHER PUBLICATIONS

International Search Report and Written Opinion of the PCT Application No. PCT/US2022/043485 dated Nov. 1, 2022, 9 pages.
International Search Report of International Patent Application No. PCT/US2021/020480 on Apr. 28, 2021, 6 pages.
Written Opinion of International Patent Application No. PCT/US2021/020480 on Apr. 28, 2021, 5 pages.
Lu et al., "Automated analysis of images in documents for intelligent document search", International Journal on Document Analysis and Recognition (IJDAR), 12.2, pp. 65-81, 2009.
Svendsen, "Chart detection and recognition in graphics intensive business documents", Dissertation, 2015, 166 pages.
Liu et al., "Review of chart recognition in document images", Visualization and Data Analysis 2013, vol. 8654, International Society for Optics and Photonics, 2013, 8 pages.
Rafkind et al., "Exploring Text and Image Features to Classify Images in Bioscience Literature", Proceedings of the BioNLP Workshop on Linking Natural Language Processing and Biology at HLT-NAACL 06, pp. 73-80, 2006.
Savva et al., "Revision: Automated classification, analysis and redesign of chart images", Proceedings of the 24th annual ACM symposium on User interface software and technology, 11 pages, 2011.
Huang et al., "Chart Image Classification Using Multiple-Instance Learning", 2007 IEEE Workshop on Applications of Computer Vision (WACV'07), IEEE, 6 pages, 2007.
Kollem et al., "A review of image denoising and segmentation methods based on medical images", International Journal of Machine Learning and Computing, vol. 9, No. 3, pp. 288-295, 2019.
Xing et al, "Deep CNN for removal of salt and pepper noise", IET Image Processing, 13.9, pp. 1550-1560, 2019.
Huang et al., "A scalable deep learning platform for identifying geologic features from seismic attributes", The Leading Edge, vol. 36, issue 3, pp. 249-256, 2017.
Wu et al., "Convolutional neural networks for fault interpretation in seismic images", SEG Technical Program Expanded Abstracts 2018, Society of Exploration Geophysicists, pp. 1946-1950, 2018.
International Preliminary Report on Patentability of International Patent Application No. PCT/US2021/020480 dated Sep. 15, 2022, 8 pages.

* cited by examiner

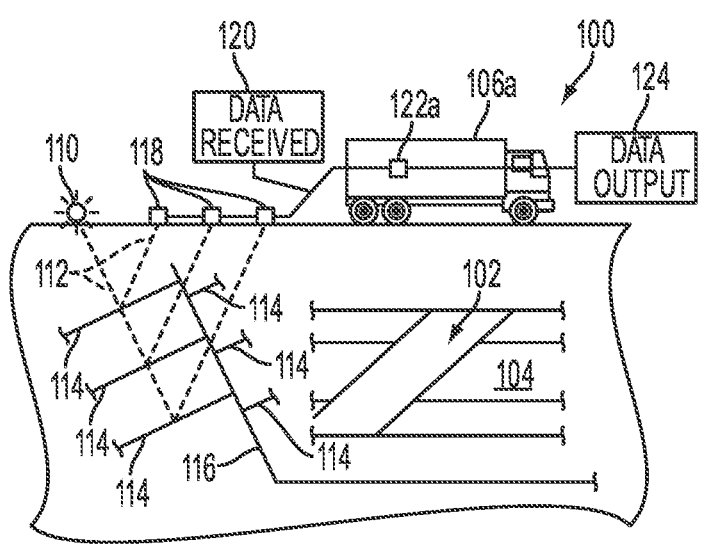
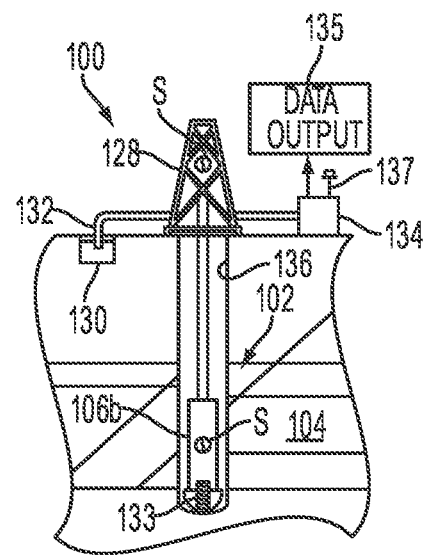
FIG. 1A  FIG. 1B
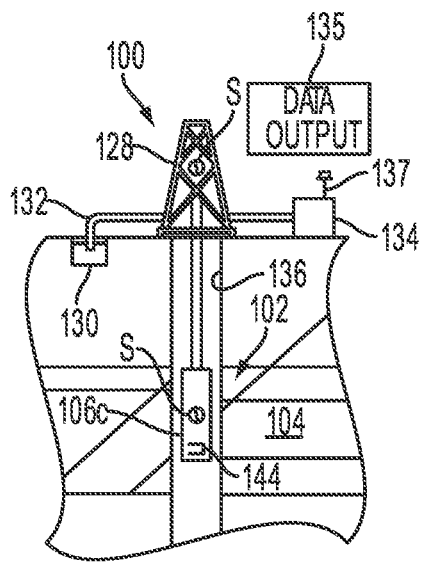
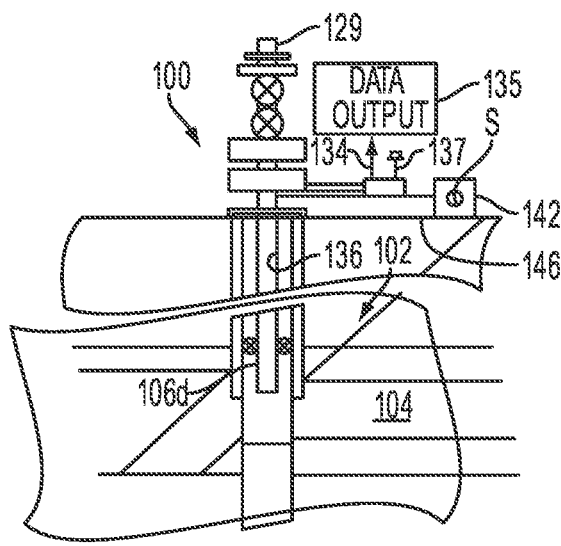
FIG. 1C  FIG. 1D

RASTER IMAGE DIGITIZATION USING MACHINE LEARNING TECHNIQUES

CROSS-REFERENCE TO RELATED APPLICATIONS

This application is a National Stage Entry of International Application No. PCT/US2021/020480, filed Mar. 2, 2021, which claims priority to U.S. Provisional Patent Application having Ser. No. 62/985,379, which was filed on Mar. 5, 2020, and is incorporated herein by reference in its entirety.

BACKGROUND

Raster images and bitmap images are data structures that represent a generally rectangular grid of pixels (points of color), viewable via a bitmapped display (monitor), paper, or other display medium. Raster images are stored in image files with varying dissemination, production, generation, and acquisition formats. Common pixel formats include monochrome, gray scale, palettized, and full color, where color depth determines the fidelity of the colors represented and color space determines the range of color coverage (which is often less than the full range of human color vision).

Raster images of seismic, well-log, and other data may include segments such as header segments, curve segments, tables, text blocks, graphs, and/or other segments. The curve segments represent the petrophysical properties of rocks in the form of graphs, as reported by a variety of sensors. A "legacy" raster image of seismic data may include images generated prior to widespread use of digital data acquisition techniques. A legacy raster image may be a scanned image saved as a computer image file. Accordingly, such legacy raster images are generally do not provide digital data, e.g., values of the plotted curves representing the petrophysical properties. Moreover, acquiring data from large libraries of such legacy raster images, while helpful for activities such as offset well analysis that form a part of well planning, etc., is time consuming and generally calls for a human user to review potentially large amounts of such non-digitized data.

SUMMARY

Embodiments of the disclosure include a method for digitizing image-based data that includes receiving an image file including one or more target objects, generating an intermediate image by removing noise from the image file using a denoising machine learning model, identifying the one or more target objects included in the intermediate image using an object segmentation machine learning model, discretizing the one or more target objects that were identified using the trained object segmentation machine learning model, and storing the one or more target objects that were discretized in a data file, visualizing the one or more target objects, or both.

Embodiments of the disclosure also include a non-transitory computer-readable medium storing instructions that, when executed by at least one processor of a computing system, cause the computing system to perform operations, the operations including receiving an image file including one or more target objects, generating an intermediate image by removing noise from the image file using a denoising machine learning model, identifying the one or more target objects included in the intermediate image using an object segmentation machine learning model, discretizing the one or more target objects that were identified using the trained object segmentation machine learning model, and storing the one or more target objects that were discretized in a data file, visualizing the one or more target objects, or both.

Embodiments of the disclosure also include a computing system including one or more processors, and a memory system including one or more non-transitory computer-readable media storing instructions that, when executed by at least one of the one or more processors, cause the computing system to perform operations. The operations include receiving an image file including one or more target objects. The image file includes a raster image including pixels, and the one or more target objects include one or more curves that represent measurements of a subsurface property. The operations also include detecting a header segment and a curve segment in the image file using a segment detection machine learning model, the header segment including one or more properties of the one or more target objects, and generating an intermediate image by removing noise from the image file using a denoising machine learning model. Generating the intermediate image comprises removing pixels that represent the noise. The operations further include identifying the one or more target objects included in the intermediate image using an object segmentation machine learning model and based at least in part on the header segment. Identifying the one or more target objects includes selecting pixels that represent the one or more target objects. The operations also include discretizing the one or more target objects that were identified using the trained object segmentation machine learning model. Discretizing the one or more target objects includes determining plot values for discrete points along the one or more curves. The operations also include storing the one or more target objects that were discretized in a data file, visualizing the one or more target objects, or both.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DETAILED DESCRIPTION

Figure 2:
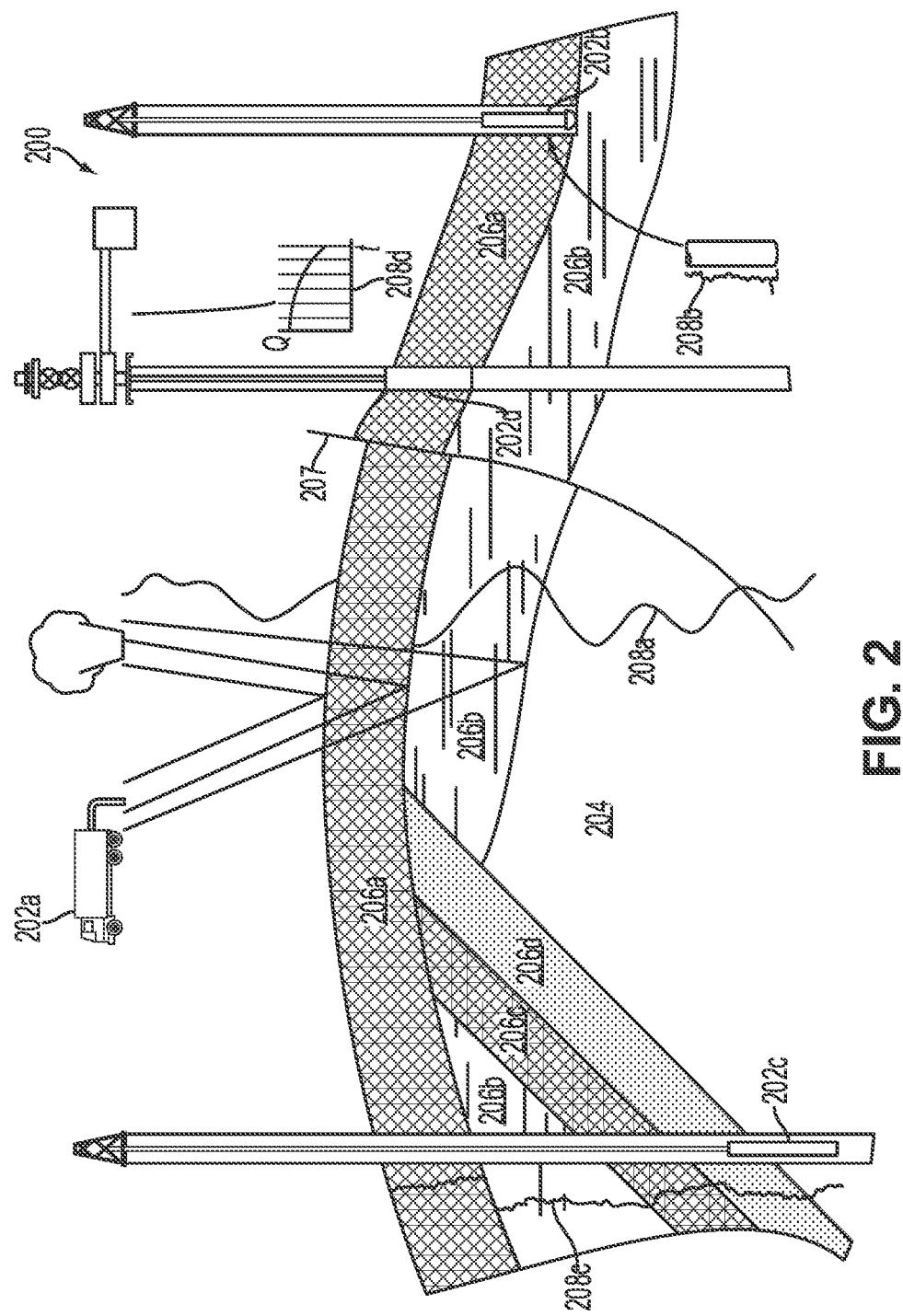

In general, embodiments of the present disclosure may provide method to detect and transform well log or other image-based data (e.g., plots and associated metadata) from raster images into digital data. The method may implement a workflow that extracts data from raster image files or images of any format using a machine-learning technique. The workflow may be orchestrated to provide an intelligent, robust, and almost intervention-free processing. Further, the deep learning modules may be structured to operate in an incremental learning mode.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Oilfield Data Acquisition Environment

Embodiments of the present disclosure may be used to analyze raster files related to oilfield data, e.g., well logs, seismic surveys, etc., and thus a discussion of such use context is discussed herein. However, it will be appreciated that at least some embodiments may be applied to extract data, e.g., image-based data files in other contexts. Furthermore, the term "raster file" is to be broadly construed to refer to any type of image-based data file, and not to be limited to any particular type of data (e.g., oilfield/well-log) data, curves, etc., nor to pixelated or non-pixelated images, unless other explicitly specified herein.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling method for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
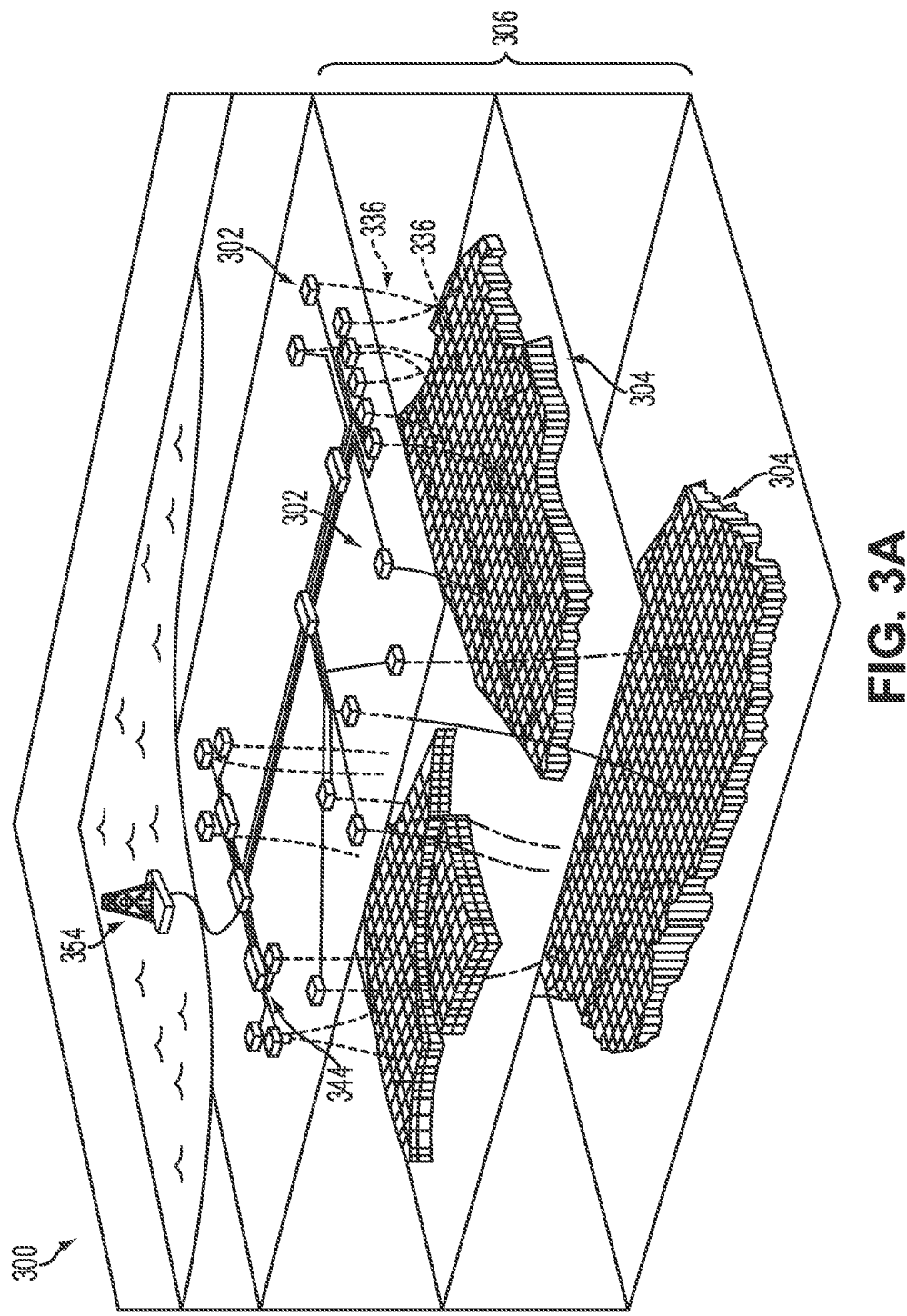

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
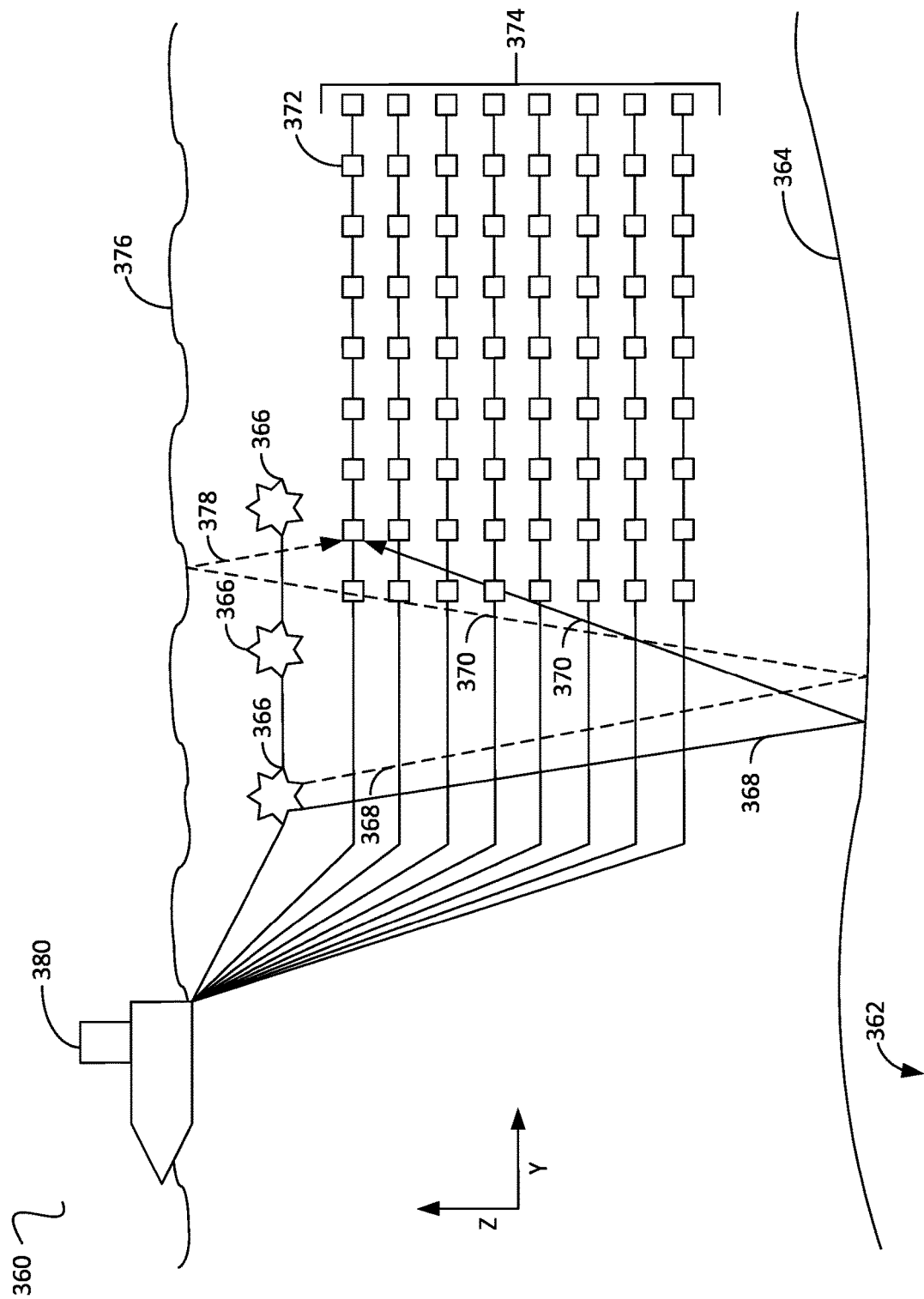

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, the marine-based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Introduction to the Automated Digital Rasterization Workflow

Figure 4A:
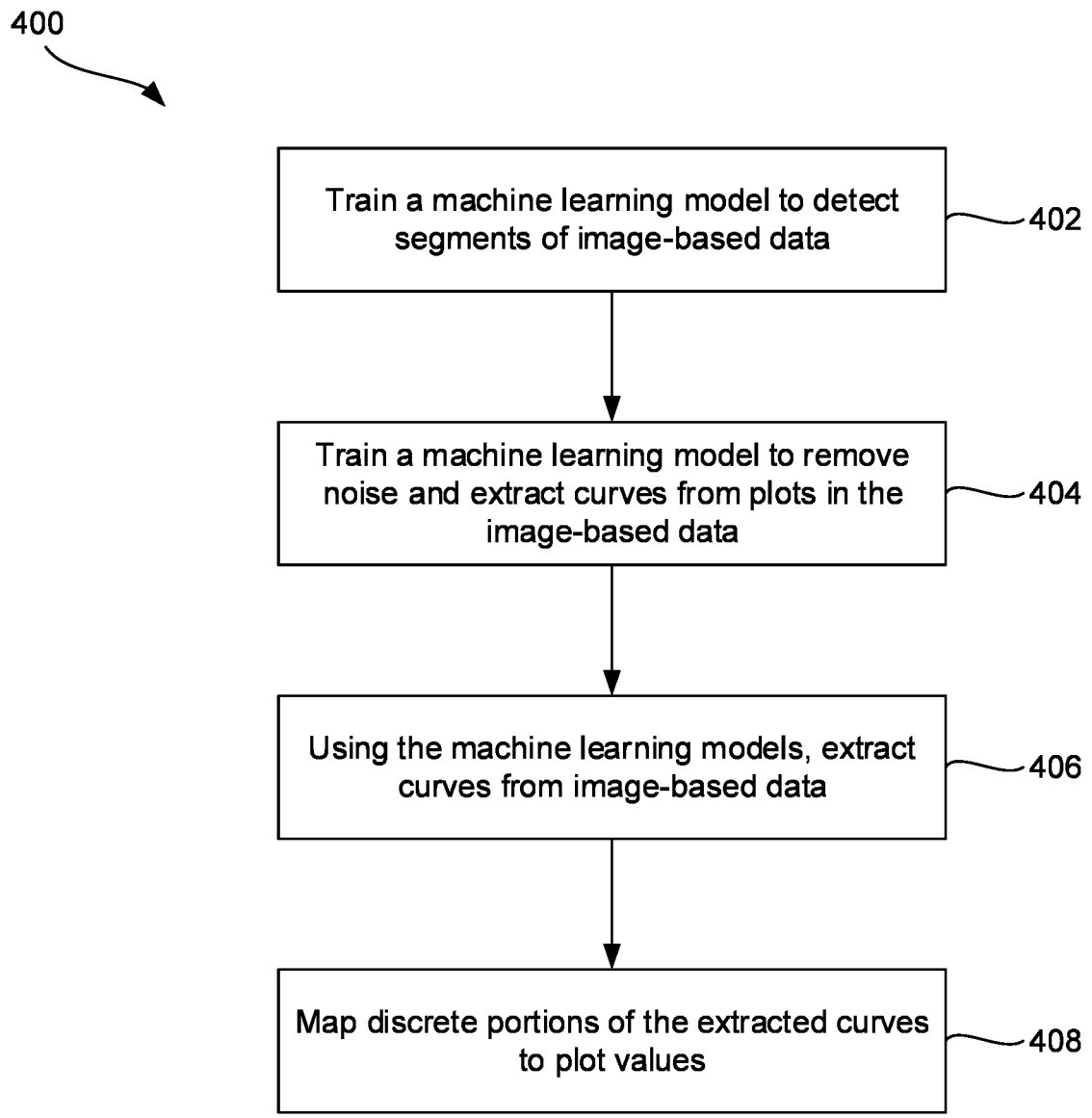
FIG. 4A illustrates a flowchart of a method for digitizing a raster image, according to an embodiment.

FIG. 4A illustrates a flowchart of a method 400 for digitizing a raster image, e.g., extracting or "segmenting" a target object stored in an image-based format (e.g., PDF, JPG, etc.), according to an embodiment. One example of a target object is a plot, e.g., a curve formed in a coordinate (e.g., Cartesian coordinate) system, in which the location of a point of the curve may represent values for independent and measured values related to subsurface (or other) properties. Other examples of target objects may include figures, headers, text, shapes, and the like. The method 400 is described herein as extracting a curve in a plot represented by the raster file; however, it will be appreciated that this is merely one example among many contemplated.

Figure 4B:
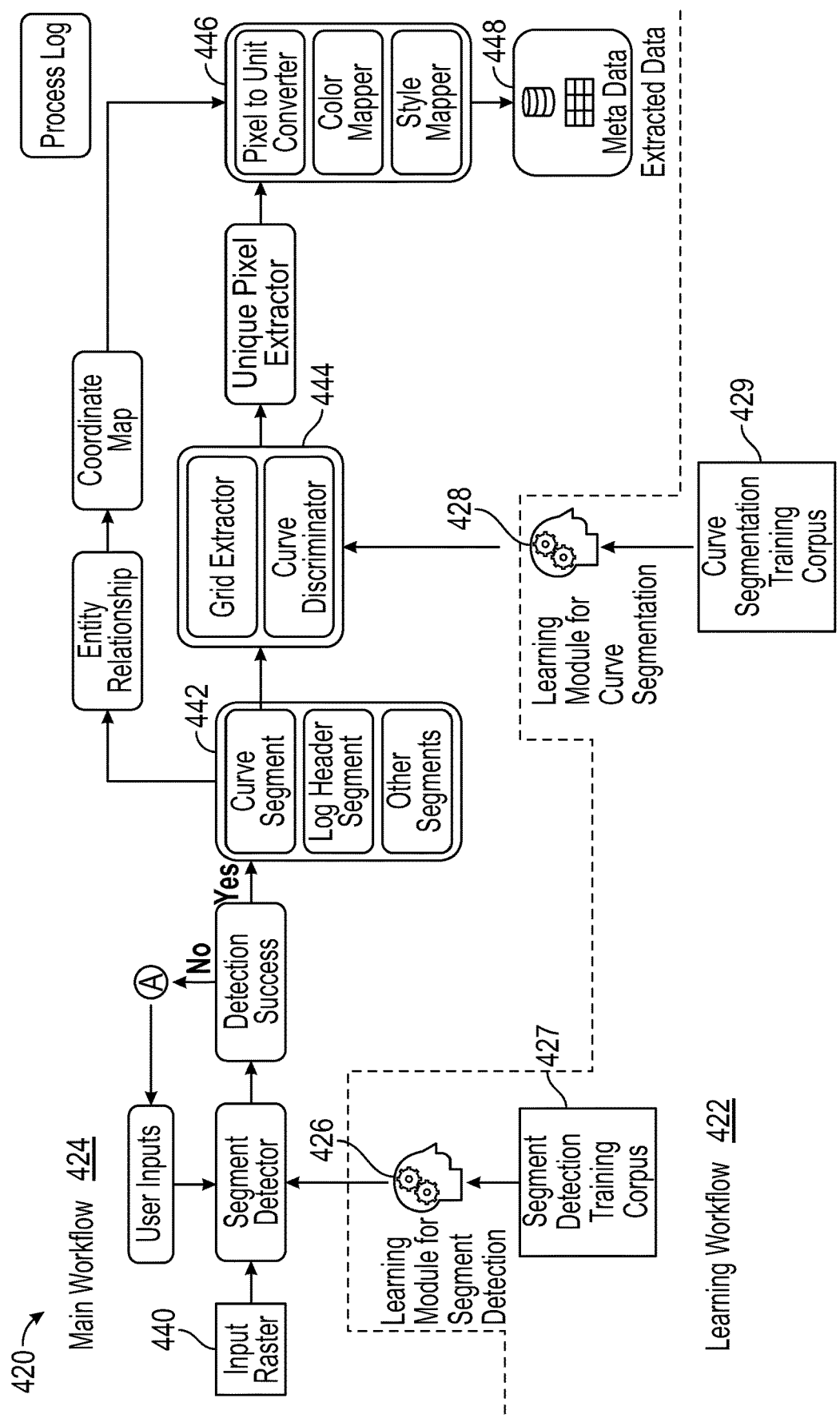
FIG. 4B schematically illustrates a workflow consistent with the method of FIG. 4A, according to an embodiment.

The plot stored in image-based format may be legacy seismic and/or well-log information, which may have initially be printed on paper, and then scanned into a large database including many such images. FIG. 4B schematically illustrates a workflow 420 consistent with the method 400, according to an embodiment.

As shown in FIG. 4B, the workflow 420 may be conceptually considered as including a learning portion 422, in which one or more machine learning models are trained, and a "main" or implementation portion 424, in which the trained machine learning models are employed to make predictions. The method 400 likewise includes a learning portion, which, in this embodiment, is made up of blocks 402 and 404, and an implementation portion.

For example, the learning portion 422 may include training a machine learning model 426 to detect segments in a raster image. This is likewise presented in the method 400 at block 402. Segments may refer to portions of a raster image, e.g., a plot and a header. The learning portion 422 may include feeding a training corpus 427, which includes pairs of headers and labels as ground truths, to the machine learning model 426 in order to train the machine learning model 426 to identify different segments in an image-based file, e.g., a raster image of a well log, seismic survey, etc.

The learning portion 422 may also include training a machine learning model 428 for extracting (e.g., segmenting) a curve (or another object) in the image-based data, as at 404 in method 400. As with the machine learning model 426, a training corpus 427 that includes pairs of input image-based data and labels may be used to train the machine learning model 428.

With the two different types of machine learning models 426, 428 (either/both of which may include two or more machine learning models) trained, the method 400 and workflow 420 may proceed to the main portion 424. In this portion, the method 400 includes using the trained machine learning models 426, 428 to extract curves from the image-based data, as at 406, and then mapping discrete portions (e.g., pixels) of the extracted curves to plot values, as at 408.

As shown in FIG. 4B, an input raster 440 may be fed to the machine learning model 426, which may extract the different segments thereof, as labeled at 442. For example, the machine learning model 426 may identify a header segment and a curve segment. The machine learning model 428 may then extract the curves from the curve segment, e.g., by removing noise, extracting the grid (e.g., to determine curve plot values based thereon), and discriminating between the individual curves, as indicated at 444. The plot values associated with the individual or "unique" curve pixels at 446 (or other extracted discrete elements of the curves) may then be mapped to values and saved to a file. Further, the color and style of the curves may be stored, e.g., for subsequent display. Various metadata at 448 may also be generated, such as the time and date of the extraction, the location of the data, quality/confidence of the data, etc.

Training the Machine Learning Models

Figure 5:
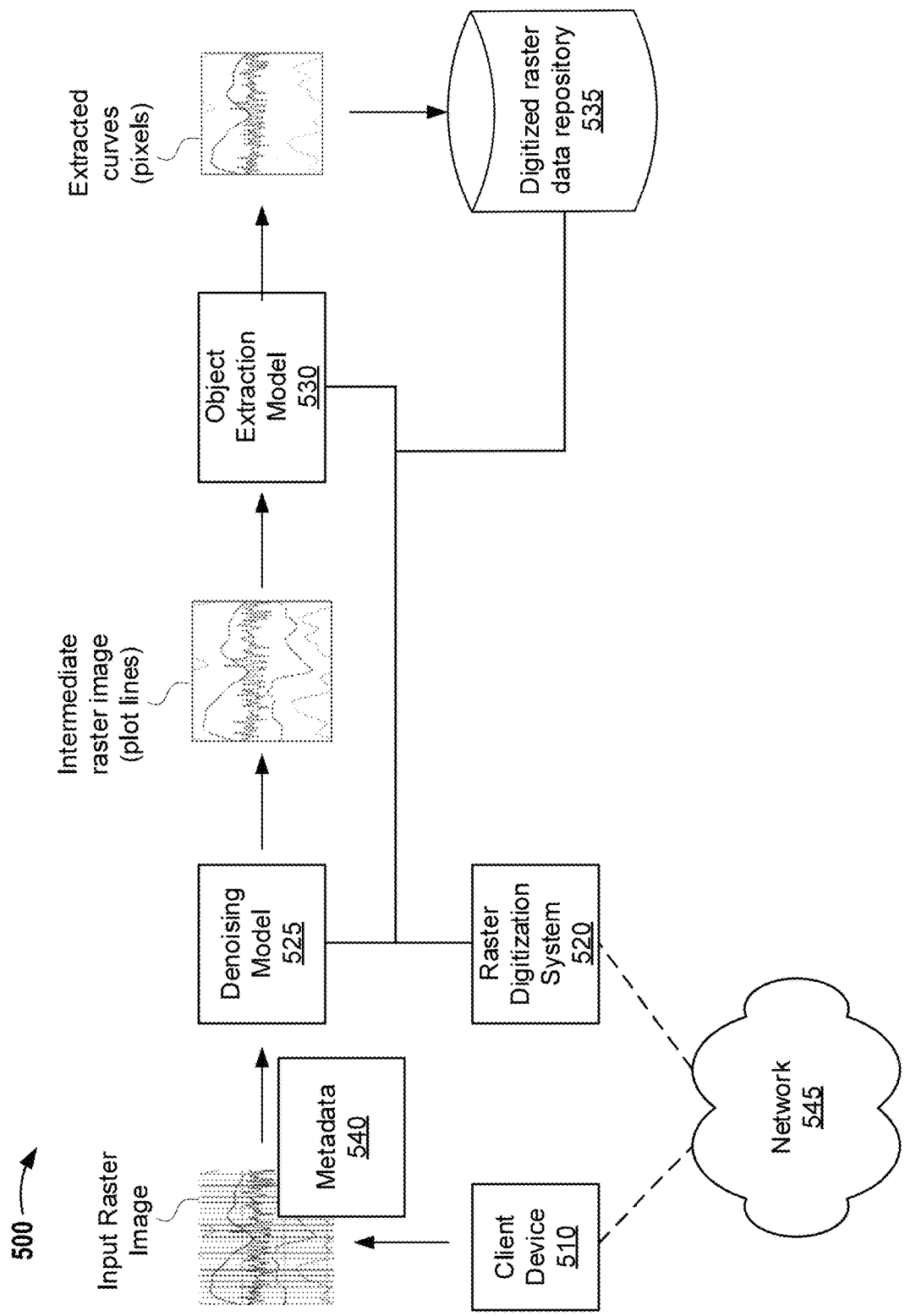
FIG. 5 illustrates a schematic view of a system for raster digitization, according to an embodiment.

FIG. 5 illustrates an example system 500 for raster digitization in accordance with aspects of the present disclosure. The system 500 includes a client device 510, a raster digitization system 520, and a network 545. The raster digitization system 520 may implement the machine learning models 426, 428 discussed above, and may thus be trained using pairs of raster images and labels.

The client device 510 may include a computing device capable of communicating via a network, such as the network 545. In example embodiments, the client device 510 may be or include one or more of a desktop computer, a server device, and/or another type of computing device. In some embodiments, the client device 510 may be used to provide training input to the raster digitization system 520. In turn, the raster digitization system 520 may include one or more computing devices that operate a machine learning system to extract a target object (e.g., plotted curve representing a measurement).

The components of the system 500 may communicate via a network 545 that may include network nodes and one or more wired and/or wireless networks. For example, the network 545 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 545 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 545 may include copper transmission cables, optical transmission fibers, wireless transmission, routers, firewalls, switches, gateway computers and/or edge servers.

The quantity of devices and/or networks in the system 500 is not limited to what is shown in FIG. 5. In practice, the system 500 may include additional devices and/or networks; fewer devices and/or networks; different devices and/or networks; or differently arranged devices and/or networks than illustrated in FIG. 5. Also, in some implementations, one or more of the devices of the system 500 may perform one or more functions described as being performed by another one or more of the devices of the system 500. Devices of the system 500 may interconnect via wired connections, wireless connections, or a combination of wired and wireless connections.

As shown in FIG. 5, the client device 510 may provide an input raster image to a denoising model 525 of the raster digitization system 520 in a runtime operation. The raster image may include multiple different graphs representing different values of data for different types of measurements (e.g., well logs, seismic data measurements, etc.) on an X-Y coordinate plane. For example, the raster image may be a "legacy" raster image in which the underlying digitized seismic (or well log, etc.) data measurements (e.g., X-Y values of the measurements) are not separately available but are visible in the raster image.

As described above, the raster digitization system 520 may be configured to remove noise from input raster images. For example, the raster digitization system 520 may include a denoising model 525 and an object extraction model 530, either or both of which may be implemented using one or more machine learning models. The denoising model 525 may be configured to remove non-object matter (e.g., noise) from the input image raster, thereby generating an intermediate image. The object extraction model 530 may receive the intermediate image, and extract and digitize the curves contained therein.

In order to train the denoising model 525, training data may be employed. The training data may include target objects (e.g., plot curves) and noise, with the curve and/or the noise being labeled. The denoising model 525 may thus be trained to identify and remove the noise and produce an intermediate raster image, which includes target objects and no, or at least attenuated, noise. It will be appreciated that noise may include grid lines, symbols, text, arrows, non-linearities, other non-curve images.

Figure 6A:
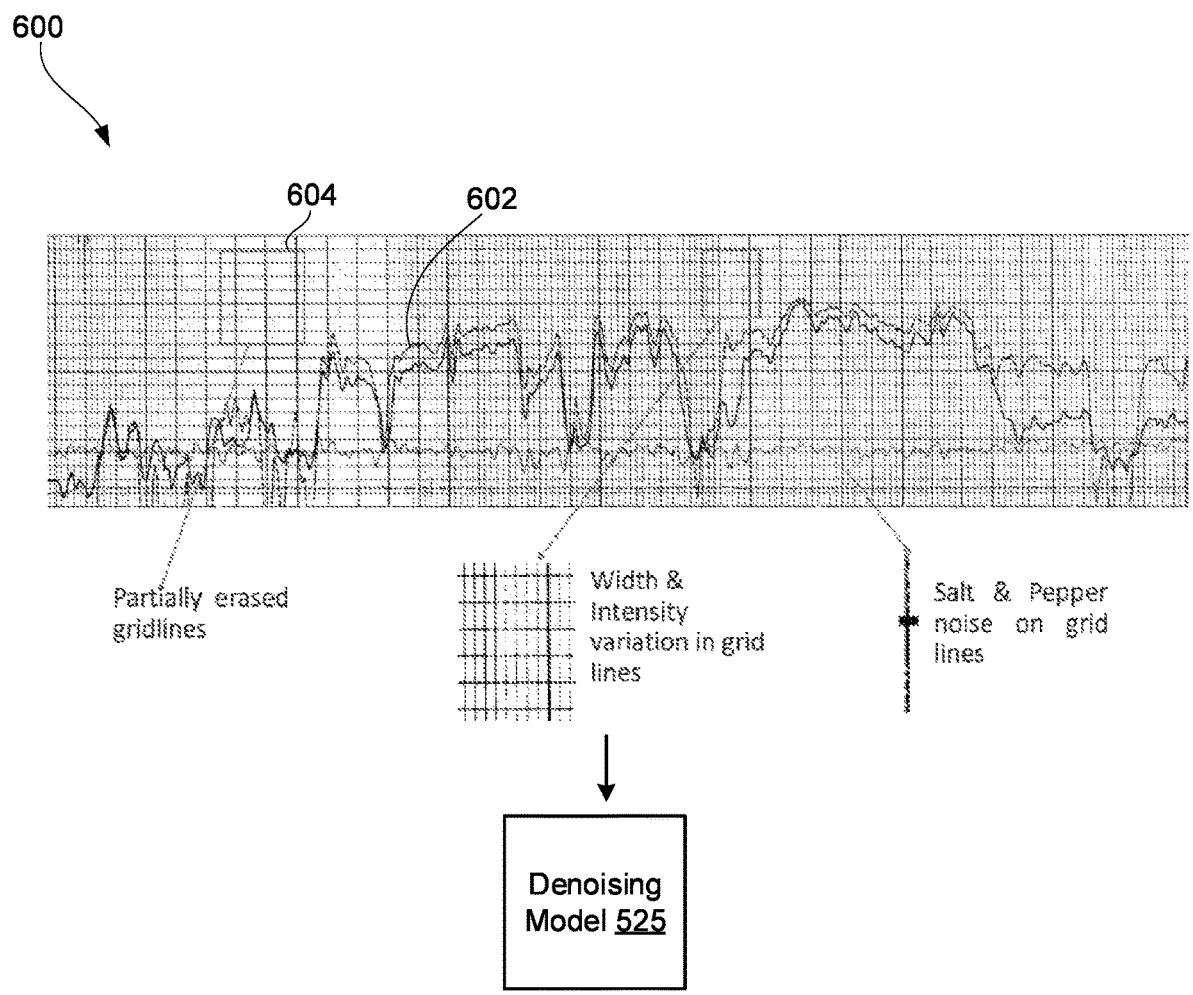
FIG. 6A illustrates an example of a raster image including noise being fed to a raster digitization model, according to an embodiment.

As an example, FIG. 6A illustrates a raster image 600 including plot curves 602 and several different types of noise. As shown, the noise 604 may be labeled, e.g., as a ground truth by a human user. There may be various different kinds of noise, and the labels provided for the noise 604 may indicate different types of noise present or may simply indicate that the feature labeled is noise, e.g., a binary determination. It will be appreciated that this labeled raster image 600 may be provided to the denoising model 525 as input in a training context, or may be provided, unlabeled, in an implementation context, with the denoising model 525 being used to remove the noise 604 in the latter case.

The object extraction model 530 may analyze the intermediate raster image, e.g., pixel-by-pixel, and determine whether each pixel represents part of a curve (or another type of target object). The object extraction model 530 may also distinguish between multiple different objects, if included. To train the object extraction model 530, training data, which includes labeled target objects and no, or attenuated, noise may be employed. In the context of plot curves as the target objects, extracted curves may then be "digitized", e.g., mapped to a series (spreadsheet) of discrete values along the curves, and saved, e.g., as a spreadsheet of such values, in a digitized raster data repository 535. In other contexts, "digitizing" may refer to mapping discrete coordinates (or other, e.g., unique, values) in any type of coordinate system to pixels representing the target object. Such digitized data may then be stored and employed to reconstruct, e.g., provide a visual depiction of ("visualize"), the original, non-digitized data, while providing additional information, such as the discrete value of the individual pixels.

Figure 6B:
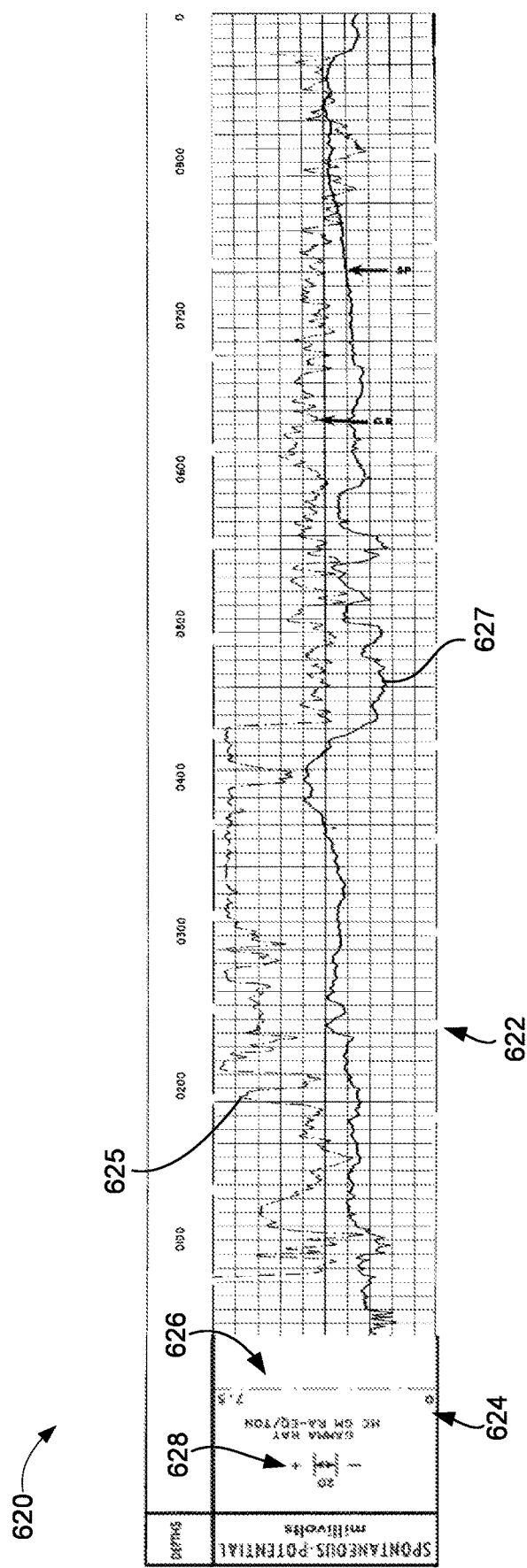
FIG. 6B illustrates an example of a raster image including a plot segment and a header segment, according to an embodiment.

Metadata 540 may also be provided to the raster digitization system 520. The metadata 540 may be provided as part of the input raster image, e.g., as a "header" segment. FIG. 6B illustrates an example of a raster image 620 including a plot or curve segment 622 and a header segment 624. The plot segment 622 includes two curves 625, 627. The header segment 624 includes information configured to permit the denoising model 525 and the object extraction model 530 to distinguish between noise and target objects and between individual target objects, respectively. In particular, the header segment 624 may provide information related to line style 626. The header segment 624 may also establish a scale 628 to permit mapping of values to the plot curves (if applicable), a type of data/information represented in the curve, a minimum and maximum range of plot values represented by the individual curves, start coordinates of the individual curves, end coordinates of the individual curves, a scale of the plot, and/or an assessment of a clarity of the plot in which the curves are represented. In some embodiments, some information may be missing from the header segment 624, e.g., a line style for a second curve. In such case, user input may be solicited and/or received to provide the missing data. Moreover, in at least some embodiments, user data may take the place of header data, e.g., if the header segment 624 is missing.

Figure 7:
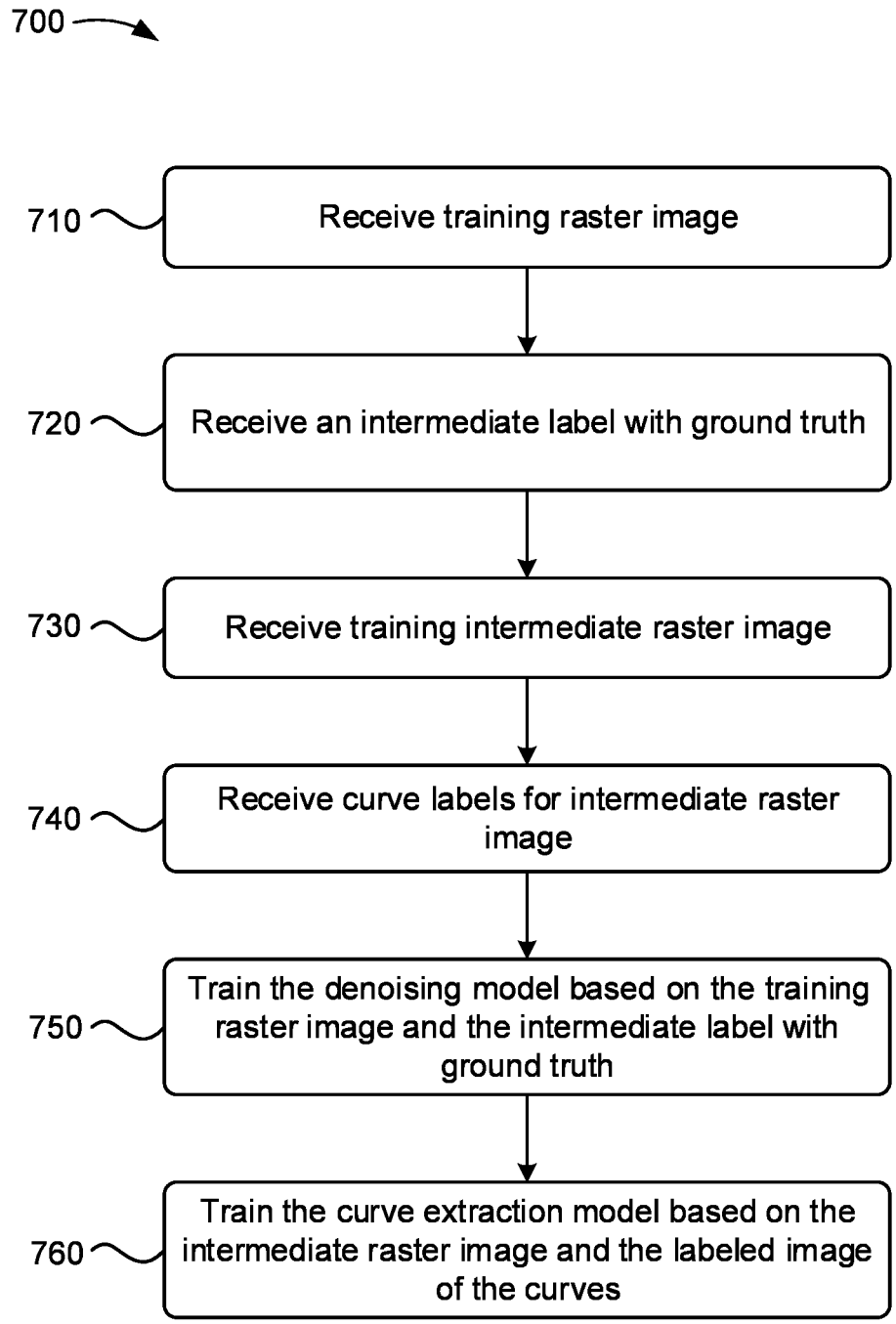
FIG. 7 illustrates an example flowchart of a method for training a denoising model and a curve extraction model, according to an embodiment.

FIG. 7 illustrates an example flowchart of a method 700 for training a denoising model and an object extraction model. Again, the example of the target object being a plot curve is used for purposes of illustration and not by way of limitation, and embodiments of the method 700 may apply equally to other types of objects such as figures, shapes, graphs, text, or other types of data. The blocks of FIG. 7 may be implemented in the environment of FIG. 5, for example, and are described using reference numbers of elements depicted in FIG. 5. As noted herein, the flowchart illustrates the architecture, functionality, and operation of possible implementations of systems, methods, and computer program products according to various embodiments of the present disclosure.

As shown in FIG. 7, the method 700 may include receiving a training raster image, as at 710. For example, the raster digitization system 520 may receive a training raster image from the client device 510 and/or other source as part of a training method to train the denoising model 525 to produce intermediate raster images. In some embodiments, the training raster image may include one or more plots of non-digitized seismic, well-log, or other types of image-based data (e.g., an image of one or more graphs representing values of seismic data measurements on X-Y axis gridlines). In various embodiments, potentially many training raster images may be received.

The method 700 also may include receiving an intermediate label with ground truth denoised intermediate raster image mapped to the training raster image, as at 720. For example, the raster digitization system 520 may receive an intermediate label with ground truth denoised intermediate raster image mapped to the training raster image. As such, the ground-truths of the curve location and the noise are known a priori to the training of the denoising model 525 and may be used to train the denoising model.

The method 700 may include receiving a training intermediate raster image, as at 730. The method 700 may also include receiving curve labels for the intermediate raster image, as at 740. Accordingly, the curve labels may serve as the ground truth against which the object extraction model 530 may be trained. For example, the raster digitization system 520 may receive a labeled, e.g., pixel-wise (for each pixel), image of the curves, in which individual curves of combined plots of two or more curves are identified separately. Moreover, the metadata 540 discussed above may also be manually added to assist in the training of the curve extraction model 530.

The method 700 may use the information received at 710-740 to train the models implemented in the raster digitization system 520. For example, the method 700 may include training the denoising model 525 based on the training raster image and the intermediate label with ground-truth, as at 750. The denoising model 525 may thus be trained to remove noise from raster images in order to generate the intermediate raster image.

The method 700 may also include training the object extraction model 530 based on the training raster image, the training intermediate raster image, and the curve labels for the intermediate raster image, as at 760. As noted above, the training raster image may include metadata 540, which may be employed to discriminate between curves and, further, to assign plot values to pixels on the curve, in order to discretize the curve(s). The pixel-based labels may thus serve as the ground truth for discerning the curves, and then determining values for the curves. Once trained, the object extraction model 530 may be configured to identify curves in a plot of two or more curves, but with attenuated or no noise, and determine values for points on the curves, e.g., for each pixel of the image that is determined to include a curve.

Digitizing Raster Images Using the Trained Machine Learning Models

Figure 8:
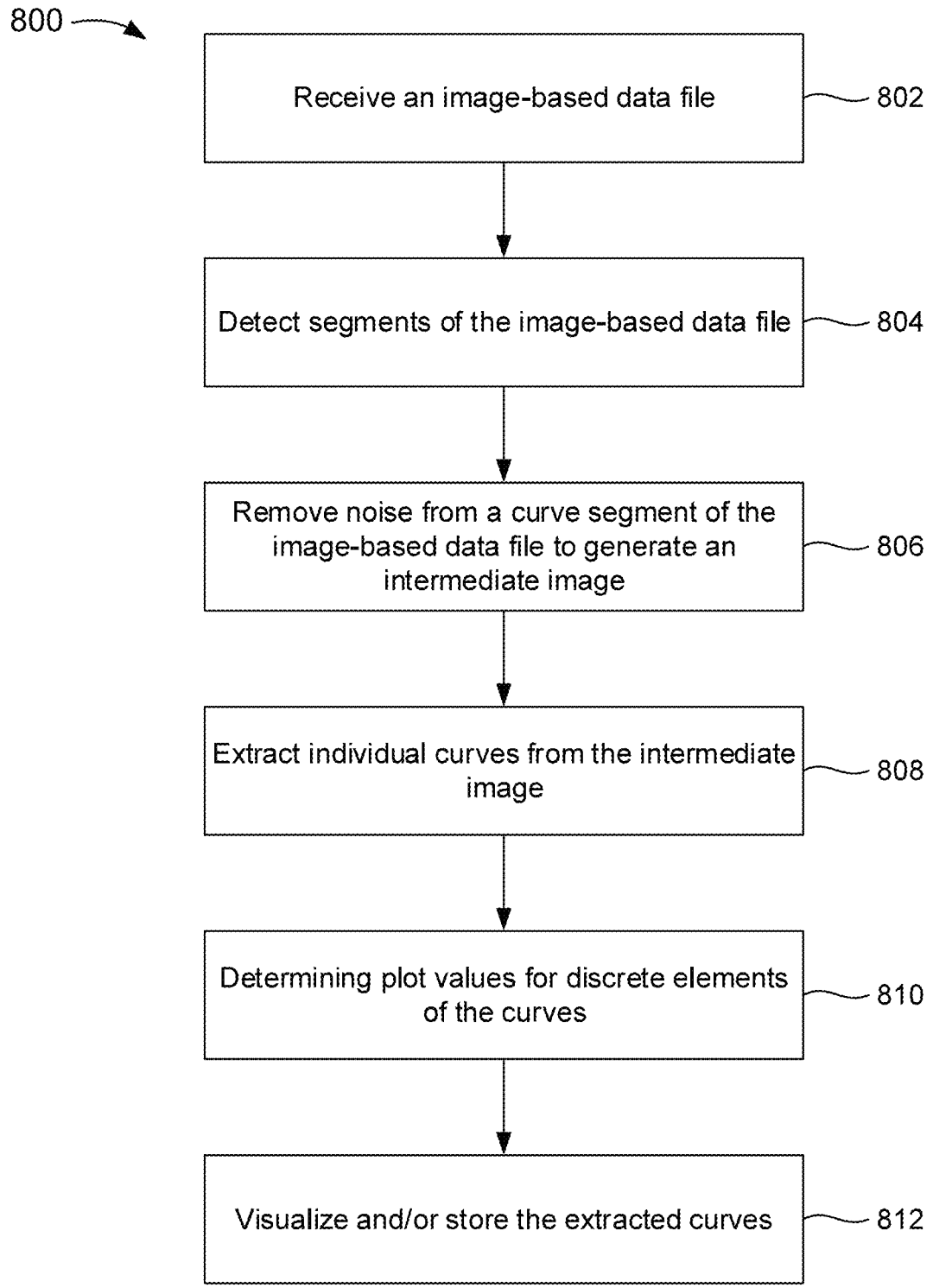
FIG. 8 illustrates an example flowchart of a method for digitizing a raster image using one or more trained machine learning models, according to an embodiment.

As discussed above with reference to FIGS. 4A and 4B, the trained machine learning models may be implemented to digitize image-based, e.g., raster image, data files. Accordingly, as shown in FIG. 8, a method 800 includes receiving an input image-based data file, e.g., a raster image including a well log or another type of data plot, as at 802. This image may include a plot including one or more curves that are to be digitized. It is again emphasized that the present disclosure is not limited to any particular type of raster image, nor any specific target object type included therein, and descriptions employing such examples are used herein merely for illustration. The method 800 may also include receiving user inputs, e.g., to supplement or provide header information in lieu of the header.

The method 800 may include detecting segments in the input image-based file using the segment detection machine learning model 426, as at 804. Such detecting may include labeling the individual segments, e.g., including a curve segment and a header segment.

The method 800 may then include removing noise from the image-based file, or at least the curve or plot segment thereof using the denoising model 525, as at 806. An intermediate image may result, from which at least a portion of the noise, including gridlines, etc., may be removed.

The method 800 may then include extracting individual curves from the intermediate image, as at 808. The individual curves may be extracted using the object extraction model 530. Further, the header and/or other metadata 540 describing the curve characteristics may be employed to discriminate one curve from another.

The method 800 may then include digitizing the curves, e.g., by determining plot values for discrete elements (e.g., pixels) of the curves, e.g., based on the grid provided in the plots, as at 810. These values may be initially represented graphically by the plot, and as mapped, are now represented digitally as numerical values, thereby representing one or more physical characteristics of the subsurface. This may also be based on the header, which may provide a scale, i.e., values for grid lines that are detected during denoising.

The method 800 may further include visualizing the extracted curves and/or storing the data associated with the curves, e.g., the individual values of the discrete elements, in a file, which may be stored for later access in a digitized raster data repository 535, as at 812.

Accordingly, embodiments of the present method may have at least the practical application of increasing efficiency and reducing time associated with retrieving data from "analog" legacy files, which are stored as images (e.g., scans). Thus, instead of one or more (e.g., teams) of human users combing through data, identifying lines, and approximating values for the lines, the trained machine learning models may provide this function. Moreover, the legacy well log, seismic, and other data may be employed for building subsurface models, planning well locations, trajectory, and equipment, and other well planning tasks.

It will be appreciated that aspects of the foregoing methods may be performed in the order in which they are presented herein, or in other orders, without departing from the scope of the present disclosure. Further, various aspects of the foregoing methods may be combined or partitioned into separate worksteps, performed in parallel, or otherwise performed simultaneously, without departing from the scope of the present disclosure.

Computing Environment

Figure 9:
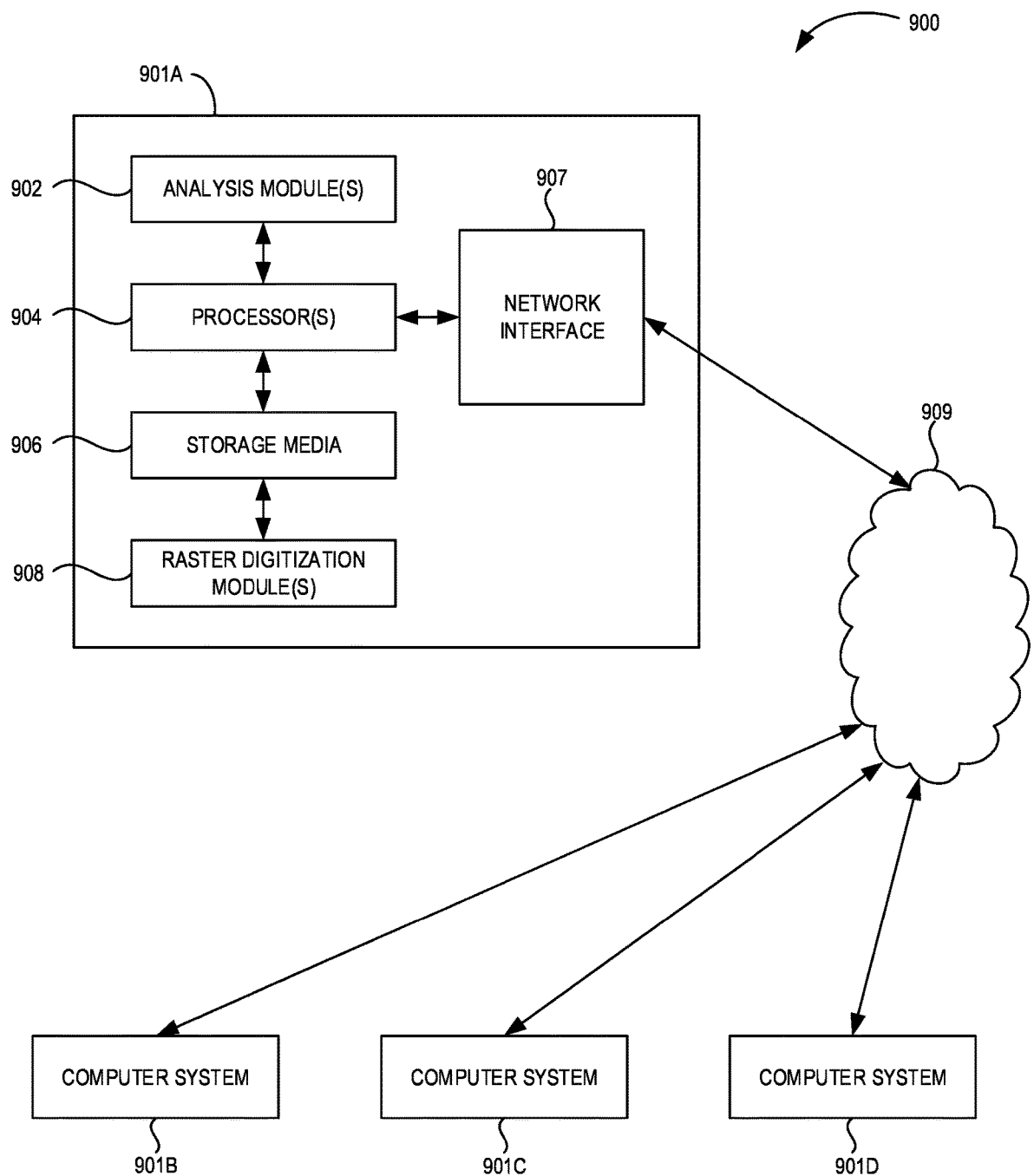
FIG. 9 illustrates a schematic view of a computing system, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 900 contains one or more raster digitization module(s) 908. In the example of computing system 900, computer system 901A includes the raster digitization module 908. In some embodiments, a single raster digitization module may be used to perform some aspects of one or more embodiments of the methods disclosed herein. In other embodiments, a plurality of raster digitization modules may be used to perform some aspects of methods herein.

It should be appreciated that computing system 900 is merely one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for digitizing image-based data, comprising:
receiving an image file including one or more target objects, wherein the image file comprises a scanned image of the target object and metadata;
identifying the one or more target objects in the image file via an object machine learning model configured to identify pixels representative of the one or more target objects;
generating an intermediate image by removing pixels representative of noise in the image file via a denoising machine learning model, wherein the intermediate image comprises only the pixels representative of the one or more target objects;
extracting one or more elements of the one or more target objects included in the intermediate image via the metadata and a trained object segmentation machine learning model configured to select one or more pixels of the pixels representative of the one or more target objects, wherein the one or more pixels are associated with the one or more elements, wherein the one or more elements comprise one or more curve segments;
discretizing the one or more pixels associated with the one or more elements of the one or more target objects by assigning a plot value to each of the one or more pixels via the trained object segmentation machine learning model and the metadata, wherein each plot value of the plot values assigned to each of the one or more pixels correspond to discrete points along each of the one or more curve segments; and
storing the plot values that were discretized in a data file, visualizing the one or more target objects based on mapping the plot values, or both.

2. The method of claim 1, wherein the one or more target objects comprise one or more figures, shapes, graphs, or text associated with a subsurface property.

3. The method of claim 2, wherein the one or more elements further comprise one or more header segments.

4. The method of claim 3, wherein the one or more elements comprise the one or more header segments, and wherein the one or more header segments comprise one or more properties of the one or more target objects, and wherein extracting the one or more target objects comprises identifying the one or more target objects based at least partially on the one or more properties.

5. The method of claim 4, wherein the one or more target objects comprise a plurality of graphs, and wherein the one or more properties of the one or more header segments are configured to distinguish the plurality of graphs from one another.

6. The method of claim 5, wherein the one or more properties comprise at least one of a type of information represented by each graph of the plurality of graphs, a line style of each graph of the plurality of graphs, a minimum and maximum range of values represented by each graph of the plurality of graphs, start coordinates of each graph of the plurality of graphs, end coordinates of each graph of the plurality of graphs, a scale of a plot in which each graph of the plurality of graphs is represented, or an assessment of a clarity of the plot in which each graph of the plurality of graphs is represented.

7. The method of claim 5, wherein each graph of the plurality of graphs comprises the one or more curve segments in a plot, and wherein extracting the one or more target objects comprises distinguishing between each graph of the plurality of graphs based at least in part on the one or more properties provided in the one or more header segments.

8. The method of claim 1, further comprising receiving one or more properties of the one or more target objects from a human user, and wherein extracting the one or more target objects comprises identifying the one or more target objects based at least partially on the one or more properties.

9. The method of claim 1, wherein the pixels representative of noise correspond to one or more grid lines, one or more symbols that are not part of the one or more target objects, or both.

10. A non-transitory computer-readable medium storing instructions that, when executed by at least one processor of a computing system, cause the computing system to perform operations, the operations comprising:
receiving an image file including one or more target objects, wherein the image file comprises a scanned image of the target object and metadata;
identifying the one or more target objects in the image file via an object machine learning model configured to identify pixels representative of the one or more target objects;
generating an intermediate image by removing pixels representative of noise in the image file via a denoising machine learning model, wherein the intermediate image comprises only the pixels representative of the one or more target objects;
extracting one or more elements of the one or more target objects included in the intermediate image via the metadata and a trained object segmentation machine learning model configured to select one or more pixels of the pixels representative of the one or more target objects, wherein the one or more pixels are associated with the one or more elements, wherein the one or more elements comprise one or more curve segments;
discretizing the one or more pixels associated with the one or more elements of the one or more target objects by assigning a plot value to each of the one or more pixels via the trained object segmentation machine learning model and the metadata, wherein each plot value of the plot values assigned to each of the one or more pixels correspond to discrete points along each of the one or more curve segments; and
storing the plot values that were discretized in a data file, visualizing the one or more target objects based on mapping the plot values, or both.

11. The medium of claim 10, wherein the one or more target objects comprise one or more figures, shapes, graphs, or text associated with a subsurface property.

12. The medium of claim 11, wherein the one or more elements further comprise one or more header segments.

13. The medium of claim 12, wherein the one or more elements comprise the one or more header segments, and wherein the one or more header segments comprise one or more properties of the one or more target objects, and wherein extracting the one or more target objects comprises identifying the one or more target objects based at least partially on the one or more properties.

14. The medium of claim 13, wherein the one or more target objects comprise a plurality of figures, and wherein the one or more properties of the one or more header segments are configured to distinguish the plurality of figures from one another.

15. The medium of claim 14, wherein the one or more properties comprise at least one of a type of information represented by each figure of the plurality of figures, a line style of each figure of the plurality of figures, a minimum and maximum range of values represented by each figure of the plurality of figures, start coordinates of each figure of the plurality of figures, end coordinates of each figure of the plurality of figures, a scale of a plot in which each figure of the plurality of figures is represented, or an assessment of a clarity of the plot in which each figure of the plurality of figures is represented.

16. The medium of claim 14, wherein each figure of the plurality of figures comprise one or more curves in a plot, wherein extracting the one or more target objects comprises distinguishing between each figure of the plurality of figures based at least in part on the one or more properties provided in the one or more header segments, and wherein the pixels representative of noise correspond to one or more grid lines, one or more symbols that are not part of the one or more target objects, or both.

17. The medium of claim 10, wherein the operations further comprise receiving one or more properties of the one or more target objects from a human user, and wherein extracting the one or more target objects comprises identifying the one or more target objects based at least partially on the one or more properties.

18. A computing system, comprising:
one or more processors; and
a memory system comprising one or more non-transitory computer-readable media storing instructions that, when executed by at least one of the one or more processors, cause the computing system to perform operations, the operations comprising:
receiving an image file including one or more target objects, wherein the image file comprises a scanned image including pixels representative of the one or more target objects and metadata;
identifying the one or more target objects in the image file via an object machine learning model configured to identify the pixels representative of the one or more target objects;
generating an intermediate image by removing pixels representative of noise in the image file via a denoising machine learning model, wherein the intermediate image comprises only the pixels representative of the one more target objects;
extracting one or more elements of the one or more target objects included in the intermediate image via the metadata and a trained object segmentation machine learning model configured to select one or more pixels of the pixels representative of the one or more target objects, wherein the one or more pixels are associated with the one or more elements, wherein the one or more elements comprise one or more curve segments;
discretizing the one or more pixels associated with the one or more elements of the one or more target objects by assigning a plot value to each of the one or more pixels via the trained object segmentation machine learning model and the metadata, wherein each plot value of the plot values assigned to each of the one or more pixels correspond to discrete points along each of the one or more curve segments; and storing the plot values that were discretized in a data file, visualizing the one or more target objects based on mapping the plot values, or both.

* * * * *